United States Patent Office 3,509,190
Patented Apr. 28, 1970

3,509,190
PROCESS FOR PREPARING ORGANOALUMINUM DIHALIDES
Morris R. Ort, Kirkwood, and Edward H. Mottus, Ballwin, Mo., assignors to Monsanto Company, St. Louis, Mo., a corporation of Delaware
No Drawing. Filed Sept. 25, 1967, Ser. No. 670,416
Int. Cl. C07f 5/06
U.S. Cl. 260—448                                    1 Claim

ABSTRACT OF THE DISCLOSURE

Aluminum, an aliphatic chloride or fluoride or an aromatic bromide, chloride or fluoride and the corresponding hydrogen halide are reacted to form an organoaluminum dihalide and usually there will be some byproducts formed, one of which will contain an aluminum atom having only a single halogen atom attached and also some aluminum trihalide. For example, when hydrogen chloride, methylene dichloride and aluminum are reacted, the following compounds are formed:

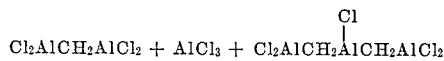

It is preferred that the hydrogen halide and aluminum be reacted in about 1:1 molar ratio for optimum yields of the dihaloaluminum compound, and it is preferred to use high purity aluminum and that all reactants be substantially moisture-free and the reaction be carried out in an inert atmosphere. Elevated temperatures will normally be preferred to react the aromatic halides and pressure can be used to contain the volatile hydrogen halide.

---

This invention relates to a process for making organic dihaloaluminum compounds.

In copending application Ser. No. 620,669, filed Mar. 6, 1967, is disclosed a process for making compounds such as $Cl_2AlCH_2AlCl_2$. The present invention is another process for making $Cl_2AlCH_2AlCl_2$ but, in addition, will make many other compounds. It is known that aluminum can be reacted at ambient temperatures with aliphatic bromides or iodides or aromatic iodides without a catalyst to give organoaluminum dihalides; however, the aliphatic chlorides and fluorides and the aromatic bromides, chlorides and fluorides cannot be reacted under these conditions with aluminum.

The process of this invention inolves reacting aluminum, an aliphatic chloride or fluoride or an aromatic bromide, chloride or fluoride, and the corresponding hydrogen halide to make an organoaluminum dihalide, and usually some byproducts having an aluminum atom with a single halogen attached will be formed and an aluminum trihalide. Preferred conditions for optimum yields are an inert atmosphere blanketing the reaction, high purity aluminum and other reactants and substantially no moisture in reactants. Also, it is preferred to use about 1 mole of hydrogen halide per mole of aluminum. An excess of the organic halide can be used as a reaction medium or an inert solvent can be used as a reaction medium.

When HF is the hydrogen halide used, because of its high degree of corrosiveness, especially to glass, special equipment conventionally used with HF will be required. Also, mixtures of hydrogen halides can be used to obtain a mixture of organoaluminum dihalides with different halogen atoms.

For the highest yields of desired products, high purity aluminum of the order of 99.9% or higher purity is desirable; however, the process is operable with relatively impure aluminum.

The organic halides can be any organic halogen compounds which do not have substituents that interfere with the process of the invention. Especially desirable reactants are hydrocarbon halides which can contain one or more halogen atoms which can be the same or different. The hydrocarbon group can be aromatic, including alkaryl groups, or aliphatic, including cycloalkyl and aralkyl groups, and can contain olefinic and acetylenic unsaturation, i.e., aryl, alkyl, cycloalkyl, aralkyl, alkaryl and unsaturated hydrocarbon groups are usable. An illustrative list of suitable organic halide reactants is as follows: methyl chloride, methylene dichloride, chloroform, carbon tetrachloride, ethyl chloride, 2,2-dichloropropane, isobutyl chloride, t-butyl chloride, vinyl chloride, ethylene dichloride, dichlorodifluoromethane, carbon tetrafluoride, trichloroethylene, ethylene fluoride, trifluoromethane, fluorobenzene, chlorobenzene, bromobenzene, o-chlorotoluene, m-chlorototoluene, p-chlorotoluene, o-dichlorobenzene, 1,2,4-trichlorobenzene, 1,2,3,4-tetrachlorobenzene, hexachlorobenzene 1-bromochlorobenzene, benzyl chloride, 1-chloronaphthalene and chlorocyclohexane. Especially suitable are the hydrocarbon halides having not more than about 18 carbon atoms and sometimes those having not more than 8 carbon atoms are preferred.

It is preferred for optimum yields of the dihaloaluminum compound that the hydrogen halide and aluminum be reacted in about 1:1 molar ratio, that high purity aluminum be used, that all reactants be substantially moisture-free and that the reaction be carried out in an inert atmosphere such as nitrogen. In many instances the reaction will proceed at room temperature or less; however, either higher or lower temperatures may be desirable depending on the particular reactants used. When using aromatic halides, generally higher temperatures will be desirable and pressure will be needed to contain the volatile hydrogen halide. It is preferred to carry out the reaction in a solvent and an excess of the organic halogen compound can be used or an inert organic solvent such as hexane, benzene or the like can be used.

The products made by the process of the invention which are old usually have well-known established uses. In general, the products are useful as Friedel-Crafts catalysts and as components of polymerization catalysts, e.g., $Cl_2AlCH_2AlCl_2$+dicyclopentadienyl dichloride as indicated by Example 1 below. In general, the halogenated aluminum compounds are useful with transition metal compounds as polymerization catalysts.

The invention will be more clearly understood from the following detailed description of specific examples thereof;

EXAMPLE 1

This example describes the making of $Cl_2AlCH_2AlCl_2$ containing some $Cl_2AlCH_2AlClCH_2AlCl_2$ and $AlCl_3$. To a 200 ml. glass flask, with nitrogen blanketing, was added 150 ml. of dry dichloromethane and dry HCl was bubbled through the dichloromethane for a few minutes. A 50 ml. aliquot sample was removed from the flask and 50 ml. of water was added to it; then, this mixture was titrated with 0.5119 N sodium hydroxide to a phenolphthalein endpoint to determine HCl content which was determined to be $2.87 \times 10^{-3}$ moles HCl/50 ml. of dichloromethane solution. Thus, the 100 ml. of dichloromethane remaining in the flask contained $5.74 \times 10^{-3}$ moles HCl. To the flask was added 0.1506 g. of Al. The mixture was stirred for 20 hours and all the aluminum had reacted. Some solids were suspended in the solution. To the flask was added $5.74 \times 10^{-3}$ moles (1.435 g.) of dicyclopentadienyltitanium dichloride. Ethylene was passed into the reaction mixture in the flask for 1 hour. The reaction mixture was then quenched with methanol, filtered, slurried in hot methanol containing HCl, filtered, washed on filter with methanol and dried in a vacuum oven. Yield was 3.9 g. of solid polyethylene.

EXAMPLE 2

This example describes the making of phenylaluminum dichloride containing some diphenylaluminum chloride and $AlCl_3$. To a 250 ml. round-bottom flask is added 22.5 g. of anhydrous chlorobenzene under nitrogen. Anhydrous hydrogen chloride gas is bubbled through the chlorobenzene for a few minutes. An aliquot sample is removed and the HCl content determined as in Example 1. Then to a pressure vessel is added the chlorobenzene containing HCl remaining in the flask and an equimolar amount of aluminum based on the HCl in the chlorobenzene. The aluminum is added in small 1/8" squares cut from aluminum sheet of 10 mils thickness. The mixture is heated and stirred overnight at a temperature of about 125° C. The reaction mixture contains phenylaluminum dichloride and diphenylaluminum chloride, which mixture can be used as a Friedel-Crafts catalyst or with transition metal compounds as polymerization catalysts.

Although the invention has been described in terms of specified examples which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:
1. A process for making $Cl_2AlCH_2AlCl_2$ comprising reacting methylene chloride with hydrogen chloride and aluminum, the mole ratio of aluminum to hydrogen chloride being about 1:1, the reaction being conducted under an inert atmosphere, and all the reactants being substantially moisture-free.

References Cited

UNITED STATES PATENTS

| | | |
|---|---|---|
| 2,270,292 | 1/1942 | Grosse. |
| 2,388,428 | 11/1945 | Mavity. |
| 2,712,546 | 7/1955 | Coates et al. |
| 2,848,472 | 8/1958 | Cottle. |
| 3,000,919 | 9/1961 | Wetroff et al. |
| 3,109,838 | 11/1963 | Chatt et al. |
| 3,288,828 | 11/1966 | Wartik et al. |
| 3,306,924 | 2/1967 | Moretti et al. |

OTHER REFERENCES

Surtees: Reviews of Pure and Applied Chem. "Chemistry of Arylaluminum Compounds," vol. 13, p. 100 (1963).

Lehmkuhl et al.: Tetrahedron Letters, No. 21, pp. 2315–2320 (1966).

Thomas: Anhydrous Aluminum Chloride in Org. Chem., Reinhold Pub. Corp., N.Y. (1941), pp. 846–848.

TOBIAS E. LEVOW, Primary Examiner

H. M. S. SNEED, Assistant Examiner